United States Patent
Haverty

[19]

[11] Patent Number: 6,088,586

[45] Date of Patent: Jul. 11, 2000

[54] SYSTEM FOR SIGNALING WITHIN A CELLULAR TELEPHONE SYSTEM

[75] Inventor: James D. Haverty, Boxborough, Mass.

[73] Assignee: Codem Systems, Inc., Merrimack, N.H.

[21] Appl. No.: 08/592,856

[22] Filed: Jan. 24, 1996

[51] Int. Cl.[7] .............................. H04Q 7/20; H04Q 7/34; H04Q 7/38

[52] U.S. Cl. .......................... 455/422; 455/456; 455/434; 455/450; 455/509; 455/511; 455/515

[58] Field of Search .................................... 455/456, 457, 455/11.1, 422, 434, 450, 509, 511, 515; 340/988, 989, 991, 992, 993, 994

[56] References Cited

U.S. PATENT DOCUMENTS

| | | | |
|---|---|---|---|
| 4,275,385 | 6/1981 | White .................................... | 340/312 |
| 4,766,295 | 8/1988 | Davis et al. ........................... | 235/383 |
| 4,891,650 | 1/1990 | Sheffer .................................. | 342/457 |
| 4,910,493 | 3/1990 | Chambers et al. ................... | 340/426 |
| 5,218,618 | 6/1993 | Sagey .................................... | 455/456 |
| 5,223,844 | 6/1993 | Mansell et al. ....................... | 342/357 |
| 5,327,144 | 7/1994 | Stilp et al. ............................. | 342/387 |
| 5,512,908 | 4/1996 | Herrick ................................. | 455/456 |
| 5,600,706 | 2/1997 | Dunn et al. ........................... | 455/456 |

*Primary Examiner*—Fan Tsang
*Assistant Examiner*—Keith Ferguson

*Attorney, Agent, or Firm*—Bourque & Associates, P.A.

[57] ABSTRACT

A cellular signaling system and method uses modified RCC signals or spread spectrum signals in an existing cellular telephone system for signaling a situation, such as an emergency or other cellular telephone communication, or for tracking, e.g. shipments or packages. The signaling system includes one or more modified signal transmitting devices, such as beacons, that transmit modified RCC signals that comply with the frequency spectrum requirements of standard RCC signals used in cellular telephone systems, but cannot be recognized by the existing cellular telephone system, or transmit a spread spectrum signal spread across a number of existing cellular channels. The signaling system further includes a modified signal receiver located at one or more cell sites in the existing cellular telephone system. When the existing cellular receiving device at a cell site does not recognize or understand the modified RCC signal, the modified signal receiver will decode the modified RCC signal. The signaling system can then determine the approximate physical geographic location of the source of the modified RCC signal, for example, using a time difference of arrival (TDOA) technique or other similar locating techniques. The signaling system is also capable of taking the appropriate actions, for example, notifying a response unit such as the police or fire department of a situation.

37 Claims, 3 Drawing Sheets

SYSTEM FOR SIGNALING WITHIN A CELLULAR TELEPHONE SYSTEM

FIELD OF THE INVENTION

This invention relates to cellular telephone systems and more particularly, to a signaling system which uses an existing cellular telephone system to provide one or more cellular telephone signals for location determination and the like.

BACKGROUND OF THE INVENTION

Signaling systems have been used in the past to signal and locate the occurrence of emergency situations such as crimes, fires, or accidents, and general tracking such as package and freight shipping or road-side assistance. Prior art signaling and locating systems have used signal transmitting devices or units and signal receiving units located at various locations within a very limited geographic area to provide for such signaling and location determination within a limited area.

Prior art systems, such as the Infrared Personal Locator System described in U.S. Pat. No. 4,275,385, require the use of an entirely new system to receive and process the signals as well as transmitting devices for sending the signals. Other existing locating systems include cellular handsets outfitted with Global Positioning System receivers.

A recent innovation is the ability to locate Cellular telephones as described in U.S. Pat. No. 5,327,144. The cellular telephone location system is an overlay to an existing cellular system, such as the Advanced Mobile Phone System (AMPS system), which is capable of locating all existing standard cell phones in North America without the need to modify the cellular system in any fashion.

The Federal Communications Commission (FCC) has allocated a 25 MHz frequency spectrum for use by such cellular systems. The spectrum is divided into two 12.5 MHz bands, known generally as A and B bands, having both control channels and voice channels. The cellular telephone system typically includes multiple cell sites (or base stations) and a centrally-located cellular switch, called a Mobile Telephone Switching Office (MTSO).

Each cell site typically uses only a single control channel. The control channel from a cell site to a mobile unit, such as a cellular telephone, is called the "forward" control channel and the control channel from the cellular telephone to the cell site is called the "reverse" control channel (RCC). The cellular telephone system uses the RCC signals for a variety of reasons, the most common of which are: registration bursts that indicate to a local cell tower (or cell site) that the phone is within its coverage region—typically to effect the proper routing of incoming calls; page responses which are returned to the cell system in response to a page request by the cell system; and origination requests which are used to initiate the set up of a normal phone call.

The prior art cellular telephone location system such as disclosed in U.S. Pat. No. 5,327,144 locates cellular telephones by placing multiple receivers (e.g. AMPS receivers)—typically located at existing cell sites, which detect and digitally sample all RCC transmissions or bursts. These samples are forwarded to a central site and are correlated to determine the time difference of arrival (TDOA) of the signal at the various cell sites from which a location is thereby computed.

Information embedded in current RCC signal transmissions or bursts includes, but is not limited to: the Mobile ID (MID), e.g. the "cell-phone number"; the Electronic Serial Number (ESN) that identifies the specific handset; the number being called (if an origination request); and the system ID. Whether the cellular telephone transmitting an RCC burst is located depends on the information transmitted. For example, the information in the RCC burst is used at the central site to filter specific RCC bursts for processing—typically reserved for emergency situations and for subscribers paying for location service.

Such a location system is limited to cellular telephone location but is not designed for use by a non-subscribing individual to signal an emergency or other situation or for use in tracking. Also, the signals used in such a cellular system are strictly regulated by the FCC and must comply with the frequency spectrum allocated and signal definition, which limits the number of cellular users and usage of the cellular system for emergency signaling and tracking.

SUMMARY OF THE INVENTION

Accordingly, the present invention provides a signaling system having a small, light weight, low power and inexpensive transmitting device, herein referred to as a beacon, that can be used by an individual to signal emergency situations or can be used for tracking packages, automobiles and the like. Furthermore, a signaling system is provided that can be used within an existing cellular telephone system without interfering with normal voice or location operation within that system. The present signaling system transmits modified cellular telephone signals such as RCC signals that include the same identifying data (e.g. MID, ESN) included in the RCC bursts produced by normal cellular phones and possess all of the same signaling characteristics to be consistent with existing RCC bursts and therefore transparent to existing FCC requirements and specifications.

The present invention features a signaling system, for tracking or signaling the occurrence of a situation, such as an emergency, in an existing cellular telephone system that uses existing cellular telephone signals, such as Reverse Control Channel (RCC) signals, within an existing cellular telephone frequency spectrum. The signaling system includes at least one modified cellular telephone signal transmitting device, such as a beacon, for transmitting at least one modified cellular telephone signal, such as a modified RCC signal or a spread spectrum signal, within the existing cellular telephone frequency spectrum.

The signaling system further includes at least one modified cellular telephone signal receiver, such as an Advanced Mobile Phone System (AMPS) receiver, for receiving and responding to a modified RCC signal or a spread spectrum signal transmitted by the signal transmitting device.

In one embodiment, the modified signal receiver is located at at least one existing cell site. The existing cell site includes an existing cellular receiver, responsive to normal RCC signals, but not capable of recognizing the modified cellular telephone signals. The modified signal includes, for example, a modified RCC burst having a modified stream of bits, such as inverted sync bits in a modified seizure precursor, that are not recognized by the existing cellular receiver.

The preferred embodiment of the signaling system further includes a location determination system, responsive to either the modified RCC signal or a spread spectrum signal, for determining an approximate physical geographic location of the modified signal transmitting device. In one preferred embodiment, the signaling system includes at least three cell sites each having a respective modified signal receiver, for receiving either the modified RCC signal or spread spectrum signal in addition to normal RCC bursts.

The signaling system according to this embodiment includes at least one location determination system at a central site, responsive to each of the modified signal receivers at the three cell sites. The location determination system determines the approximate physical geographic location of the modified signal transmitting device using a Time Difference Of Arrival (TDOA) method, e.g. by calculating the time difference of arrival of the modified RCC signal or spread spectrum signal at each of the modified signal receivers or by other similar and comparable methods.

The preferred embodiment of the modified signal transmitting device, herein called a beacon, includes an activation mechanism that is activated upon the occurrence of the situation, for example, a button that can be depressed when an emergency occurs. In this embodiment, the signal transmitting device emits either a modified RCC burst or a spread spectrum signal upon activating the button. In another embodiment, such as might be used for tracking, the signal transmitting device transmits the modified RCC signal continuously or at predetermined time intervals upon activation of the activation mechanism.

The present invention also features a method of signaling in an existing cellular telephone system including at least one cell site, for receiving at least one RCC signal. The method comprises the steps of: providing at least one modified cellular telephone signal transmitting device and at least one modified cellular telephone signal receiver; transmitting at least one modified cellular telephone signal by the modified signal transmitting device; receiving at least one modified cellular telephone signal by the cell site; and decoding the modified signal with the modified signal receiver. In one example, the step of receiving the modified signals further includes receiving both normal RCC and modified RCC signals in a cellular receiver.

The preferred method of signaling in an existing cellular telephone system includes the step of determining an approximate physical geographic location of the modified signal transmitting device, such as a beacon. In one embodiment, the method includes providing a modified signal receiver at each of at least three cell sites in an existing cellular telephone system, and determining the location of the modified signal transmitting device by calculating a time difference of arrival of the modified signals at the modified signal receiver in each cell site. The preferred method further includes providing notification of the approximate physical geographic location of the modified signal transmitting device, for example, to a response unit such as a police or fire department.

The preferred method of signaling further includes activating the modified signal transmitting device upon indication of a situation, such as an emergency or other similar situations. Upon activation of the modified signal transmitting device, the modified RCC signal or the spread spectrum signal is transmitted, for example, constantly, randomly, or intermittently at predetermined time intervals.

In one example of the present method, transmitting at least one modified signal includes transmitting a modified RCC signal burst that corresponds to the frequency spectrum and signal requirements of existing RCC signals but is not recognizable by the existing cellular receiver, for example, by altering one or more of the bits in the RCC burst. One way of transmitting such a modified RCC signal includes transmitting an RCC signal burst having a modified seizure precursor that is not recognized by the existing cellular receiver and is recognized only by the modified signal receiver. For example, one or more sync bits in the seizure precursor of RCC signal could be inverted to form the modified seizure precursor.

In another example of the method, the step of transmitting at least one modified signal includes transmitting at least one spread spectrum signal spread across a number of control and/or voice channels in the designated frequency spectrum.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
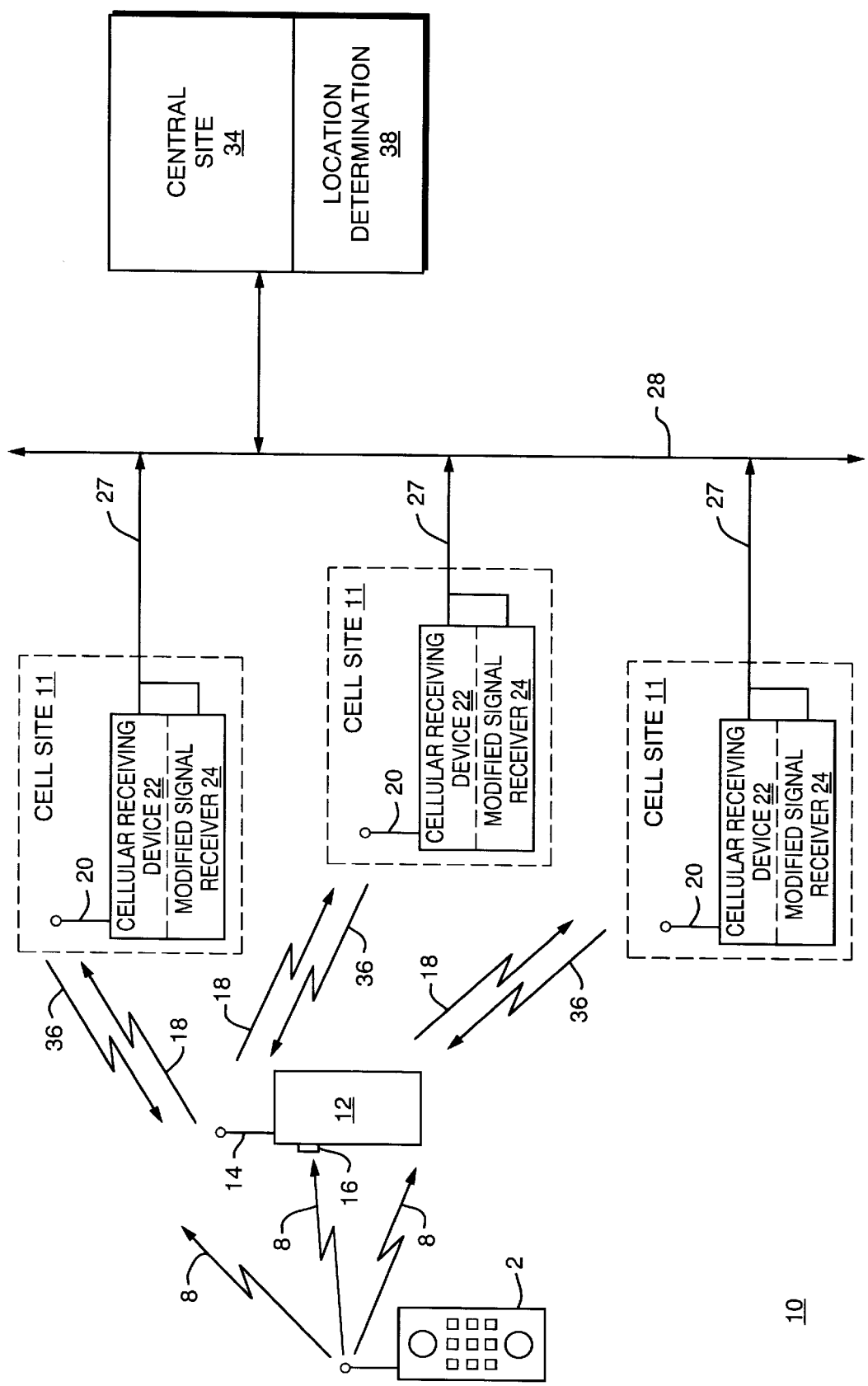
FIG. 1 is a schematic diagram of a signaling system using an existing cellular telephone system according to the present invention.

A signaling system 10, FIG. 1, according to the present invention, uses an existing cellular telephone system, such as the system described in U.S. Pat. No. 5,327,144, which system is incorporated herein by reference. The existing cellular telephone system includes one or more cell sites 11 that receive one or more cellular telephone signals 8, such as Reverse Control Channel (RCC) signals transmitted periodically by one or more cellular telephones 2, for example, as RCC signal "bursts".

Each standard RCC signal burst includes caller identifying indicia such as a Mobile ID (MID) (e.g. the cell-phone number), and Electronic Serial Number (ESN), the number being called, and the system ID. A database of valid identifying indicia is kept by each cellular telephone provider and compared with received RCC bursts. Any RCC signal bursts that do not contain valid identifying indicia will not be processed. Since the RCC burst, by definition, contains such identifying information, only a finite number of users are permitted.

Each cell site 11 includes, in addition to other cellular telephone system equipment well known in the art, a cellular signal receiver 22, such as an Advanced Mobile Phone System (AMPS) receiver, that receives the RCC signals 8 from the cellular telephones 2 by way of one or more cellular antennas 20 in communication with each cellular signal receiver 22. One use for the RCC signal 8 is to inform the cell site 11 that the cellular phone is within range of cellular antenna 20 at the cell site 11. This allows a cellular system to know where to transmit a signal to allow phone coverage to a given cellular phone.

The signaling system 10 according to the present invention uses modified signals 18, such as modified Reverse Control Channel (RCC) signals or spread spectrum signals, within the existing cellular telephone system to signal the occurrence of an emergency situation, such as an accident, theft, fire, attack, road-side assistance or other crimes, or for tracking, such as package and freight shipping, without interfering with the normal operation of the cellular telephone system. According to the preferred embodiment, the signaling system 10 is also used to determine the approximate physical geographic location of the source of the modified signal 18 and thus the emergency or other situation, as will be described in greater detail below.

The signaling system 10 according to the preferred embodiment of the present invention operates in at least one of two modes: a modified RCC mode or a spread spectrum mode. In the modified RCC mode, the signaling system 10 uses modified RCC signals modified in such a way so as to have the same signaling features as standard or conventional RCC signals 8 used by the existing cellular telephone system (i.e. comply with the frequency spectrum and signal definition allocated to RCC signals) but are not recognizable by the existing cellular telephone system, as will be described in greater detail below. In the spread spectrum mode, the signaling system 10 uses spread spectrum signals transmitted across a number of voice and/or control channels within the allocated frequency spectrum to improve position or location determination accuracy when signaling an emergency, as will be described in greater detail below.

Although the present invention is described as using modified RCC signals or spread spectrum signals, the present invention contemplates modifying other types of cellular telephone signals used in cellular systems, including forward control channel signals, according to the invention described herein and using those modified signals according to the teachings of the present invention. The present invention also contemplates using standard RCC signals solely for signaling emergencies or for tracking, for example, with a one-way RCC signal transmitter.

The signaling system 10 includes at least one modified signal transmitting device 12, such as a beacon, for transmitting the modified signal 18. The modified signal transmitting device 12 can be any device capable of at least transmitting a radio frequency signal, such as a modified RCC signal or spread spectrum signal, to the existing cellular telephone system.

The preferred embodiment of the modified signal transmitting device 12 includes an activation mechanism 16, such as a depressable button, for activating the signal transmitting device 12 and causing the modified signal 18 to be transmitted. The present invention also contemplates other activation mechanisms including, but not limited to, voice or noise activation, motion activation, smoke activation, heat activation, and other activation mechanisms or triggers. The preferred embodiment of the modified signal transmitting device 12 also includes an antenna 14, such as an internal antenna, a standard external cellular phone antenna, or any other type of antenna to allow transmission of the modified signals 18.

The modified signal transmitting device 12, according to one embodiment, is a small, lightweight, portable or mobile beacon built from a subset of standardly available cellular telephone components, which may be carried by a person or in a vehicle. If an emergency situation, such as a crime, sudden health problem or other situation occurs, the person activates the modified signal transmitting device or beacon 12 using the activation mechanism 16. Applications for the signaling system 10 and transmitting device 12 include, but are not limited to: used or worn on a person for personal safety and security; used in shipments to track rolling stock, packages or inventory; and used in automobiles (either mounted or incorporated into existing radio) for emergencies or roadside assistance.

According to one embodiment, the transmitting device 12 is programmable to operate in different modes wherein the modified signal 18 is transmitted intermittently at predetermined intervals upon activation of the transmitting device 12. For example, in an emergency mode, the transmitting device 12 will transmit a modified RCC signal burst every 10 seconds, and in a tracking mode, the transmitting device 12 can be set to transmit a modified RCC signal burst from once a minute to once every several hours as selected by a switch setting on the unit.

A further mode of operation includes an enhanced emergency mode in which the modified signal transmitting device 12 transmits the spread spectrum signals to improve the accuracy of locating the transmitting device 12, as will be described in greater detail below. In one example, the modified signal transmitting device includes both a modified RCC signal transmitter and spread spectrum signal transmitter and the desired mode can be selected with a switch (not shown).

In an alternative embodiment, the transmitting device 12 includes a receiver and is capable of receiving signals 36, such as standard or modified Forward Control Channel signals, from the cell sites 11. For example, the transmitting device 12 can operate in a receiving mode where the transmitting device 12 only transmits a modified signal 18 in response to a page request or other command from one or more cell sites 11. In another example, a disable command can be sent to the transmitting device 12 by way of forward control channel signals 36 to prevent the transmitting device 12 from transmitting unnecessary or nuisance RCC signal bursts or spread spectrum signals. Using modified forward control channel signals 36 in a similar way as the modified RCC signal bursts to send the page request or disable command allows each transmitting device 12 to be allocated and respond to identifying indicia which appear to be the same as, but are independent from the standard cellular telephones 2 in the existing cellular telephone system.

In the preferred embodiment, each cell site 11 in the signaling system 10 further includes a modified signal receiver 24 capable of receiving and recognizing or decoding at least the modified signals 18 transmitted by the modified signal transmitting device 12. In one example, the modified signal receiver 24 is a separate device, such as a modified AMPS receiver, added to each cell site 11 in communication with cellular antennas 20 and cellular receivers 22 although it is understood that this capability can be added to the standard cellular receivers 22. The cellular antennas 20 in the existing cellular telephone system will pick up the modified signal 18 and the modified signal receiver 24 will receive and decode the modified signal 18 when the existing cellular receiver 22 is unable to recognize or decode the modified signal 18.

One type of modified signal receiver 24 includes a receiver, such as an AMPS receiver, modified to receive and recognize or decode the modified RCC signal bursts. If the signaling system uses modified RCC signal bursts, the cellular receivers 22 in the existing cellular telephone system will receive the modified RCC signal burst because the modified RCC signal burst is spectrally consistent with standard RCC signal bursts, as will be described in greater detail below. After receiving the modified RCC burst, however, the cellular receiver 22 will not be capable of recognizing or decoding the modified RCC signal burst. The modified signal receiver 24 simultaneously receives the modified RCC burst and then decodes the modified RCC burst.

Another type of modified signal receiver 24 includes a receiver, such as an AMPS receiver, modified to recognize or decode spread spectrum signals.

In another embodiment, the cellular receiving device 22 of the existing cellular telephone system is modified, e.g. by programming with software and/or hardware modification, so that the cellular receiver 22 can understand or decode the modified RCC signals or the spread spectrum signals as well as the standard RCC signals 8.

Upon receiving and decoding the modified RCC signal or spread spectrum signal 18 in the modified signal receiver 24, the signaling system 10 can take the appropriate action, for example, notifying a response unit, such as the local police or fire departments, of an emergency situation that requires their attention. Each of the cell sites 11 including the modified signal receivers 24 are preferably in communication with other cell sites 11 and with a central site 34 by way of signal or communication paths 27, 28 which can take the form of wire or radio signal paths. The central site 34 can be used to further process and determine information regarding the modified signal 18, for example determining the nature of the emergency or the location of the emergency.

In one preferred embodiment, the signaling system 10 determines the approximate physical geographic location of the source of the modified signal 18 (i.e. the modified signal transmitting device 12) using a technique such as the Time Difference of Arrival (TDOA) technique described in greater detail in U.S. Pat. No. 5,327,144, incorporated herein by reference, although other techniques are considered within the scope of this invention. In general, the TDOA technique determines the location of the source of the modified signal 18 by calculating the differences in times of arrival of the modified signal 18 at each of at least three cell sites 11. The time differences of arrival of the modified signal 18 to each cell site 11 is then used to determine the approximate physical geographic location for modified signal transmitter 12.

Other methods of determining the location of the signal transmitter 12 include using the angle of arrival (triangulation) or power proximity detection methods. For example, appropriately placed receivers spaced with sufficient granularity can compute a radial distance of the signal from the receiver site. Overlay circles are formed by this radial distance from each of the receiver sites and the intersection of these circles serves as the position.

The signaling system 10 according to the preferred embodiment includes a location determination system 38 in communication with or responsive to the modified signal receivers 24 to determine the location based on the time differences of arrival at each modified signal receiver 24 or one of the other techniques. In one example, the location determination system 38 is located at the central site 34 in communication with the cell sites 11. According to another example, one modified signal receiver 24 may query other modified signal receivers 24 which have also received the modified signal 18, to determine the location of modified signal transmitting device 12.

The present invention also contemplates a modified signal transmitting device 12 that updates and records its own location information by way of a separate locating system, such as a Global Positioning Satellite (GPS), Loran, or inertial positioning systems. Such a transmitting device 12 would have a receiver capable of receiving signals 36 from a cell site 11, upon receipt of a modified signal 18 from the transmitting device 12, to query for further location information and then transmitting that information.

Figure 2:
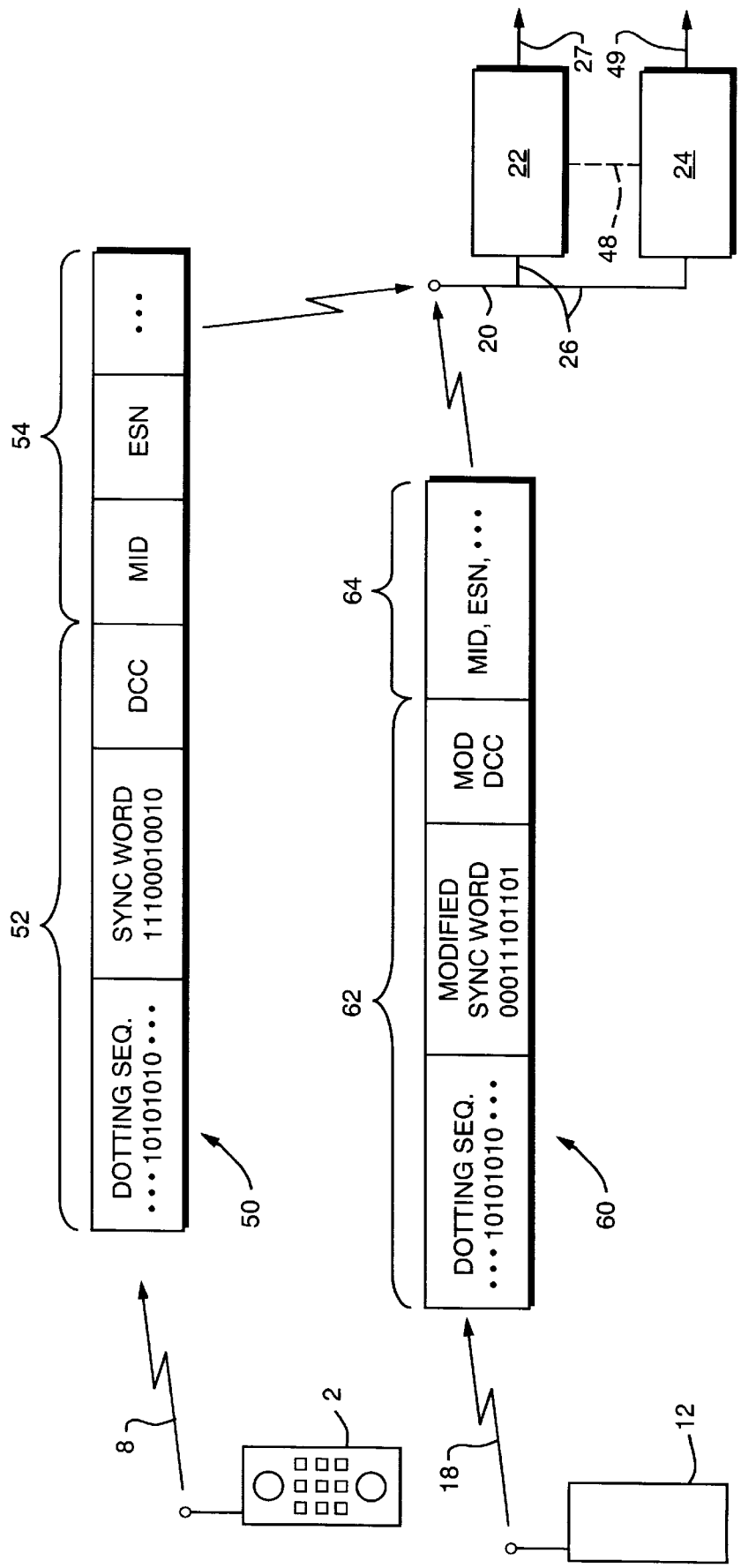
FIG. 2 is a schematic diagram of one embodiment of a modified Reverse Control Channel (RCC) signaling system according to one embodiment of the present invention.

According to the modified RCC signal mode of the signaling system 10, FIG. 2, the modified signal 18 includes a modified RCC burst 60 modified in a way that maintains the spectral integrity and other signal characteristics of a standard or conventional RCC burst 50 used in the existing cellular telephone system. As discussed above, the standard RCC burst 50 has been allocated a predetermined frequency spectrum and is used for alerting cellular networks that a cellular phone 2 is within range of a certain cell antenna 20.

Each RCC burst is coded as set forth in the Electronic Industries Association (EIA) Interface Standard number 88 (IS-88). The standard RCC signal burst 50 used in cellular telephone systems includes a seizure precursor 52 and a data portion 54. The data portion 54 includes a string of bits representing identifying indicia, such as an MID and ESN. This provides information, for example, a given user account for a cellular telephone system. When a cellular antenna 20 receives a standard RCC signal burst 50, it is transmitted to cellular receiver 22 which analyzes the RCC signal and updates account and location information for the telephone cell network.

The seizure precursor 54 precedes the data, for enabling the cellular system to gain initial RCC burst synchronization. The seizure precursor 54 consists of a dotting sequence, a sync word and a coded—Digital Color Code (DCC). The dotting sequence is a simple bit reversal pattern (i.e., . . . 10101010 . . . ) that allows the cellular receiver to gain initial carrier and baud rate synchronization and tracking. The sync word that follows is a specific bit sequence (11100010010) that indicates that the dotting sequence has been completed and that the DCC will immediately follow. This allows the cellular receiver to unambiguously frame the data that follows the dotting sequence.

The present invention includes the transmission of a modified RCC signal burst 60 within the same frequency spectrum and having the same basic signal properties as standard RCC signal bursts 50. Modifying the seizure precursor 62 of the RCC burst 60, for example, by inverting the polarity of some or all or of the sync bits or by reversing their order, will not change the basic signal properties specified by the FCC but will make the modified RCC burst 60 unrecognizable by a conventional cellular system. Other simple modifications include, but are not limited to, inverting all of the bits in the message (including the seizure precursor 62 and data portion 64), using illegal Digital Color Codes, or using a predetermined code for the modified RCC burst data portion 64 which would be invalid as an RCC signal code, such as an invalid telephone serial number and invalid account ID. Hence, the modified RCC burst 60 would meet all applicable FCC requirements for the signal without interfering with normal cellular operations.

When the cellular receiver 22 in the existing conventional cellular telephone system receives such a modified RCC burst 60, the cellular receiver 22 will be unable to acquire synchronization or will otherwise reject the message as illegal and will therefore ignore the modified RCC burst 60. The modified signal receiver 24 will be modified so as to be capable of establishing synchronization and decoding the modified RCC burst 60. Accordingly, the cellular telephone system modified according to the present invention will check for both normal RCC bursts 50 and modified RCC bursts 60.

In one example, the modified signal receiver 24 may simply monitor all signals received on signal path 26 from antenna 20 substantially simultaneously with the existing signal receiver 22. The modified signal receiver 24 can communicate with an outside source, such as a central site, either through the cellular receiver 22 over path 27 or through its own signal path 49.

Modifying the stream of bits in the modified RCC burst 60, e.g. the sync bits in the seizure precursor 62, allows the signaling system 10 to reuse, for modified transmitting devices 12, all of the MID/ESN numbers that may have already been allocated for existing cell phones. The present invention also contemplates using the modified RCC signal for standard cellular communication.

Another example of a modified RCC burst 60 includes the location of the modified signal transmitting device 12 encoded into the modified RCC burst data portion 64. As long as the RCC burst 60 is spectrally consistent with but appears invalid to cellular receiver 22, cellular receiver 22 will reject the RCC burst 60 and allow modified signal receiver 24 to process the RCC code. Therefore, as long as at least a portion of the modified RCC burst 60, e.g. the modified seizure precursor 62, appears invalid, extra information may be encoded into modified RCC burst 60 including location, type of emergency, or any other information.

The spread spectrum mode of operation is typically reserved strictly for emergency signaling. In this mode, the modified signal transmitting device 12 codes the identifying indicia, such as the MID and ESN, contained in the RCC burst using a signal that is spread across a wide band (>1 MHz) within the allocated voice bands. Spreading the signal across a wide band has the distinct advantage of improving the location accuracy of TDOA based location systems. Sufficient spreading will allow a system to achieve an accuracy on the order of tens of feet as opposed to several hundred feet as is the case for location on normal RCC bursts.

A direct sequence spread spectrum signal spread across the spectrum voice channels allocated for voice traffic in either the A or B bands maximizes usage of the frequency spectrum allowed by the Federal Communications Commission and improves the accuracy of the signaling system 10. The improvement in accuracy results from a well established theoretical correlation between the bandwidth of a signal and its detection, and is particularly evident when cross correlation processing is used to compute the time difference of arrival between two signals as disclosed in U.S. Pat. No. 5,327,144. The ability to suppress ambient noise increases with increasing signal bandwidth results in an attendant improvement in the ability of the receiver to accurately detect the time difference of arrival of the signal between any two sites and thereby the correct location of the source of the signal.

In this mode, the spreading, signal levels and transmission rate are such that the signal would not nominally interfere with ongoing communications in these channels. Also, spreading the signal across the voice band as opposed to the control band precludes it from interfering with system control in any way. The spread spectrum approach also enjoys the added benefit of being able to code each signal transmitting device uniquely, allowing multiple emergency transmitting devices to operate concurrently without interference.

The present invention also contemplates transmitting a spread spectrum signal across a wide band of control channels or across both control and voice channels.

Accordingly, the signaling system 10 according to the present invention can operate in conjunction with the existing cellular telephone system because the cellular receiver 22 handles regular cellular telephone signals and the modified signal receiver 24 handles modified signals transmitted by modified signal transmitting device 12.

Figure 3:
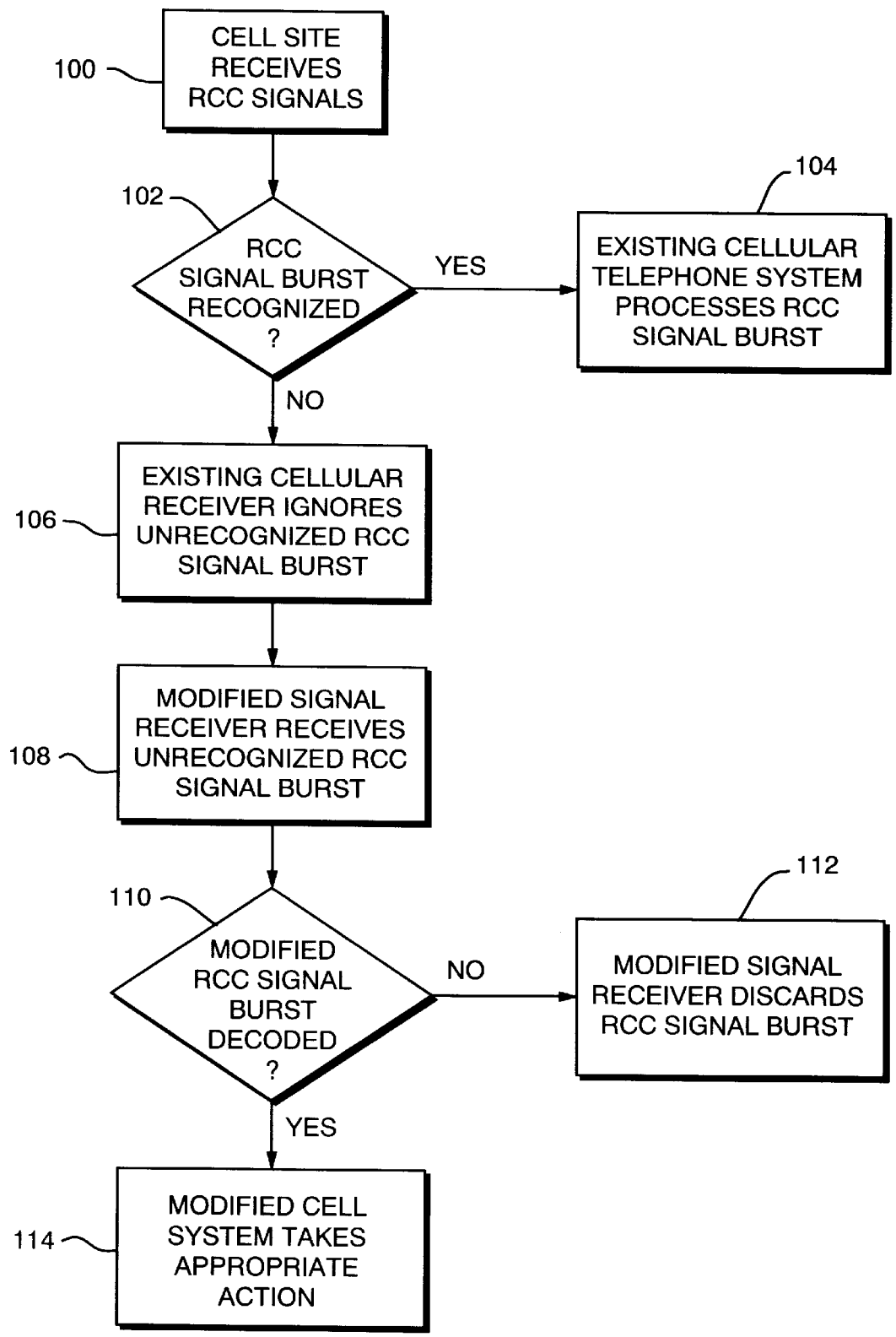
FIG. 3 is a flow chart of a method of signaling using modified RCC signals in an existing cellular telephone system according to one embodiment of the present invention.

A method of operating the signaling system 10, FIG. 3, according to the modified RCC embodiment of the present invention includes the step of receiving at least one modified RCC signal burst, step 100. The cellular receiver 22 decides if the received RCC signal burst is recognizable and/or valid, step 102. If the RCC signal is recognized as a valid standard RCC signal burst, the cellular receiver 22 will decode or process the information encoded in the RCC signal burst according to standard cellular telephone protocol, step 104.

If the cellular receiver 22 does not recognize the RCC burst as a standard RCC burst or determines that the received RCC signal burst is an invalid RCC signal, the cellular receiver 22 will ignore or discard the RCC signal, step 106. Modified signal receiver 24 will attempt to decode the invalid RCC signal, step 108. Preferably, the modified RCC signal receiver 24 and the existing cellular receiver simultaneously receive and monitor the signals received in the cell site 11.

Should the modified signal receiver 24 be unable to decode the received RCC signal burst, step 110, modified signal receiver 24 will also discard the apparently unusable and invalid RCC signal, step 112. However, if modified signal receiver 24 recognizes and decodes the modified RCC signal, modified signal receiver 24 will then take appropriate action, step 114, such as notifying the police, fire department or other response unit.

Accordingly, this invention allows a standard telephone cellular system or network to be "piggybacked" for use as a separate cellular network and/or situation and location signaling system. No extra RF bandwidths are needed to implement the present invention and, therefore, the signaling system complies with existing FCC frequency spectrum requirements. A modified signal transmitter or beacon may be inexpensively provided, and an existing cellular telephone network can be exploited to perform an essentially hereto unperformed service with minimal modifications and cost. Therefore, this invention provides a novel way of vastly increasing the usability of a cellular telephone network and the allocated frequency spectrum.

Modifications and substitutions by one of ordinary skill in the art are considered to be within the scope of the present invention which is not to be limited except by the claims which follow.

What is claimed is:

1. A signaling system using modified cellular telephone signals within an existing cellular telephone frequency spectrum used by an existing cellular telephone system, said signaling system comprising:

at least one modified cellular telephone signal transmitting device, for transmitting at least one modified reverse control channel (RCC) signal across at least one reverse control channel within said existing cellular telephone frequency spectrum, wherein said at least one modified RCC signal is unrecognizable by said existing cellular telephone system; and at least one modified cellular telephone signal receiver, for receiving and decoding said at least one transmitted modified RCC signal.

2. The signaling system of claim 1, wherein said at least one modified cellular telephone signal transmitting device also transmits at least one spread spectrum signal transmitted across a plurality of channels within said existing cellular telephone frequency spectrum.

3. The signaling system of claim 1, further including a location determination system, responsive to said at least one transmitted cellular telephone signal, for determining at least an approximate physical geographic location of said at least one modified cellular telephone signal transmitting device.

4. The signaling system of claim 1, further including at least one modified RCC signal receiver located at each of at least three cellular telephone signal receiving sites, for independently receiving said at least one transmitted modified cellular telephone signal; and a location determination system, responsive to said at least one modified cellular telephone signal receiving device at each of said at least three cellular telephone signal receiving sites, for determining at least an approximate physical geographic location of said at least one modified cellular telephone signal transmitting device using a time difference of arrival of said at least one transmitted modified cellular telephone signal at each of said at least one modified cellular telephone signal receiving device at said at least three cellular telephone signal receiving sites.

5. The signaling system of claim 1, wherein said at least one modified cellular telephone signal receiving device includes a modified Advanced Mobile Phone System (AMPS) receiver.

6. The signaling system of claim 1, wherein said at least one modified cellular telephone signal transmitting device includes an activator.

7. The signaling system of claim 1, wherein said at least one modified cellular telephone signal transmitting device includes a means for intermittently transmitting said at least one modified RCC signal at predetermined time intervals.

8. The signaling system of claim 1, wherein said at least one modified cellular telephone signal transmitting device includes a signal receiver portion, for receiving at least one signal from at least one cellular telephone signal receiving site.

9. The signaling system of claim 1, wherein existing RCC signals in said existing cellular telephone system include an RCC signal burst having a stream of bits, for defining a message, wherein said at least one modified RCC signal includes a modified RCC signal burst having a modified stream of bits with at least one bit inverted from said stream of bits in said RCC signal burst, wherein said modified stream of bits of said modified RCC signal burst is not recognized by said existing cellular telephone system and is recognized by said modified cellular telephone signal receiver.

10. The signaling system of claim 1, wherein existing RCC signals in said existing cellular telephone system include a seizure precursor, for establishing RCC signal synchronization, wherein said at least one modified RCC signal includes a modified RCC signal burst having a modified seizure precursor, wherein said modified seizure precursor of said modified RCC signal burst is not recognized by said existing cellular telephone system and is recognized by said modified cellular telephone signal receiver.

11. The signaling system of claim 1, wherein existing RCC signals in said existing cellular telephone system include a digital color code, wherein said at least one modified RCC signal includes an invalid digital color code unrecognizable by said existing cellular telephone system.

12. The signal system of claim 1, wherein said modified RCC signal includes encoded information pertaining to a situation.

13. A modified existing cellular telephone system, said existing cellular telephone system using an existing cellular telephone frequency spectrum and including at least three cell sites, for determining a location of at least one modified cellular telephone signal transmitting device, said system comprising:

at least one modified cellular telephone signal transmitting device, for transmitting at least one modified RCC signal to said at least three cell sites, wherein said modified RCC signal is modified by manipulating at least one bit in said modified RCC signal such that said modified RCC signal is within said existing cellular telephone frequency spectrum but is unrecognizable by said existing cellular telephone system;

at least three modified cellular telephone signal receivers, each of said at least three modified cellular telephone signal receivers located at a respective one of said at least three cell sites, for receiving and decoding said at least one modified RCC signal; and at least one location determination system, responsive to each of said at least three modified cellular telephone receivers, for determining at least an approximate physical geographic location of said at least one modified cellular telephone signal transmitting device.

14. The modified existing cellular telephone system of claim 13, wherein existing RCC signals in said existing cellular telephone system include a stream of bits, for defining a message, wherein said modified RCC signal includes a modified stream of bits with at least one bit inverted from said stream of bits in said existing RCC signal, and wherein said modified stream of bits of said modified RCC signal is unrecognizable by existing cellular telephone receivers at each of said at least three cell sites but is recognizable by said at least three modified cellular telephone signal receivers at said at least three cell sites.

15. The modified existing cellular telephone system of claim 13, wherein existing RCC signals in said existing cellular telephone system include a seizure precursor, for establishing RCC signal synchronization, wherein said at least modified RCC signal includes in modified seizure precursor, and wherein said modified seizure precursor of said modified RCC signal is unrecognizable by existing cellular telephone receivers at each of said at least three cell sites but is recognizable by said at least three modified cellular telephone signal receivers at said at least three cell sites.

16. The modified existing cellular telephone system of claim 13, wherein existing RCC signals in said existing cellular telephone system include a digital color code, where said at least one modified RCC signal includes an invalid digital color code, and wherein said invalid digital color code of said modified RCC signal is unrecognizable by existing cellular telephone receivers at each of said at least three cell sites but is recognizable by said at least three modified cellular telephone signal receivers at said at least three cell sites.

17. A signaling method for an existing cellular telephone system using an existing cellular telephone frequency spectrum and including at least one cell site, said method comprising the steps of:

providing at least one modified cellular telephone signal transmitting device and at least one modified cellular telephone signal receiver;

transmitting at least one modified RCC signal with said at least one modified cellular telephone signal transmitting device, wherein said modified RCC signal is within said existing cellular telephone frequency spectrum but is unrecognizable by an existing cellular receiver at said at least one cell site;

receiving at least said at least one modified RCC signal in said at least one cell site;

determining that said modified RCC signal is unrecognizable by said existing cellular receiver at said at least one cell site; and decoding said at least one modified RCC signal received by said at least one modified cellular telephone signal receiver.

18. The method of claim 17, wherein said step of transmitting said at least one modified RCC signal includes transmitting a modified RCC signal burst having a stream of bits
wherein said stream of bits of said modified RCC signal burst is received by said existing cellular receiver at said at least one cell site and is determined to be invalid by said existing cellular receiver.

19. The signaling method of claim 17, wherein existing RCC signals in said existing cellular telephone system include a stream of bits, for defining a message, and wherein the step of transmitting at least one modified RCC signal includes inverting at least one bit in said stream of bits such that said stream of bits is unrecognizable by said existing cellular receiver at said at least one cell site.

20. The signaling method of claim 17, wherein existing RCC signals in said existing cellular telephone system include a seizure precursor, for establishing RCC signal synchronization, and wherein the step of transmitting at least one modified RCC signal includes the step of modifying said seizure precursor such that said seizure precursor is unrecognizable by said existing cellular receiver at said at least one cell site.

21. The signaling method of claim 17, wherein existing RCC signals in said existing cellular telephone system include a digital color code, and wherein the step of transmitting at least one modified RCC signal includes providing an invalid digital color code such that said invalid digital color code is unrecognizable by said existing cellular receiver at said at least one cell site.

22. The method of claim 17, further including the step of determining at least an approximate geographic location of said at least one modified cellular telephone signal transmitting device.

23. The method of claim 22, wherein said existing cellular telephone system includes at least three cell sites;
wherein said step of providing said at least one modified cellular telephone signal receiver includes providing a modified cellular telephone signal receiver at each of said at least three cell sites; and
wherein said step of determining said at least one approximate geographic location of said at least one modified cellular telephone signal transmitting device includes calculating a time difference of arrival of said at least one modified RCC signal at each of said at least three cell sites.

24. The method of claim 22, further including the step of:
responding to said at least one modified RCC signal after said at least one modified cellular telephone signal receiver decodes said at least one modified RCC signal.

25. The method of claim 22, further including the step of:
providing notification of said at least an approximate geographic location of said at least one modified cellular telephone signal transmitting device.

26. The method of claim 17, further including the step of:
activating said at least one modified cellular telephone signal transmitting device upon indication of a situation.

27. The method of claim 26, wherein said step of transmitting said at least one modified RCC signal with said at least one modified cellular telephone signal transmitting device includes intermittently transmitting said at least one modified RCC signal at predetermined time intervals upon activating said at least one modified cellular telephone signal transmitting device.

28. The method of claim 27, wherein said step of activating said at least one modified cellular telephone signal transmitting device upon indication of a situation includes activating said at least one modified cellular telephone signal transmitting device upon occurrence of an emergency.

29. A modified cellular telephone signal transmitting device for use within an existing cellular telephone frequency spectrum in an existing cellular telephone system that recognizes existing RCC signals having a stream of bits, said transmitting device comprising:
modified RCC signal generating means, for generating a modified RCC signal by modifying at least one bit in said stream of bits of said existing RCC signals such that said modified RCC signal is unrecognizable by said existing cellular telephone system; and
transmitting means, responsive to said modified RCC signal generating means, for transmitting said modified RCC signal within said existing cellular telephone frequency spectrum in said existing cellular telephone system.

30. The modified cellular telephone signal transmitting device of claim 29, wherein said modified RCC signal generating means generates said modified RCC signal by inverting at least one bit in said stream of bits such that said stream of bits is unrecognizable by said existing cellular telephone system.

31. The modified cellular telephone signal transmitting device of claim 29, wherein said modified RCC signal generating means generates said modified RCC signal by modifying a precursor of said existing RCC signals such that said modified seizure precursor is unrecognizable by said existing cellular telephone system.

32. The modified cellular telephone signal transmitting device of claim 29, wherein said modified RCC signal generating means generates said modified RCC signals by providing an invalid digital color code in said modified RCC signal such that said invalid digital color code is unrecognizable by said existing cellular telephone system.

33. The modified cellular telephone signal transmitting device of claim 31, wherein said control signals include modified forward control channel (FCC) signals transmitted by at least one modified FCC signal transmitter.

34. The modified cellular telephone signal transmitting device of claim 29 further including a transmitting device locating means, for locating said modified cellular telephone signal transmitting system.

35. The modified cellular telephone signal transmitting device of claim 29 further including control signal receiving means, for receiving modified control signals which control said modified cellular telephone signal transmitting device.

36. The modified cellular telephone signal transmitting device of claim 35, wherein said control signal receiving means receives at least one page request control signal, and wherein said transmitting means transmits said modified RCC signal in response to each said at least one page request control signal received by said control signal receiving means.

37. The modified cellular telephone signal transmitting device of claim 35, wherein said control signal receiving means receives at least one disable command control signal, and wherein said transmitting means disables transmission of said modified RCC signal in response to said disable command control signal received by said control signal receiving means.

* * * * *